US008166665B2

(12) United States Patent
Potgeter et al.

(10) Patent No.: US 8,166,665 B2
(45) Date of Patent: May 1, 2012

(54) PAINT BRUSH CLEANING APPARATUS

(76) Inventors: Joel D. Potgeter, West Olive, MI (US); Michael A. Rose, Hudsonville, MI (US); David L. Ver Burg, Dorr, MI (US); John E. Bramer, Grandville, MI (US)

( * ) Notice: Subject to any disclaimer, the term of this patent is extended or adjusted under 35 U.S.C. 154(b) by 0 days.

(21) Appl. No.: 12/151,281

(22) Filed: May 5, 2008

(65) Prior Publication Data

US 2009/0272410 A1 Nov. 5, 2009

(51) Int. Cl.

| | |
|---|---|
| ***F26B 17/24*** | (2006.01) |
| ***F26B 17/30*** | (2006.01) |
| ***F26B 9/10*** | (2006.01) |
| ***F26B 25/20*** | (2006.01) |
| ***F26B 5/08*** | (2006.01) |
| ***A01F 25/12*** | (2006.01) |

(52) U.S. Cl. ................................ 34/58; 34/240; 34/312

(58) Field of Classification Search ................ 34/58, 59, 34/60, 61, 312, 240; 134/149, 900, 153, 134/140

See application file for complete search history.

(56) References Cited

U.S. PATENT DOCUMENTS

| | | | | |
|---|---|---|---|---|
| 2,711,748 | A * | 6/1955 | Barsness | 134/149 |
| 2,778,050 | A * | 1/1957 | Meinhardt | 15/248.2 |
| 2,794,265 | A | 6/1957 | Kruger | |
| 2,822,814 | A * | 2/1958 | Torkelson | 134/135 |
| 2,931,661 | A * | 4/1960 | Harris | 279/103 |
| 3,081,473 | A * | 3/1963 | Wells | 15/143.1 |
| 3,399,463 | A * | 9/1968 | Stott | 34/58 |
| 3,837,091 | A * | 9/1974 | Meyer | 34/58 |
| 4,090,309 | A * | 5/1978 | Rollins | 34/58 |
| 4,545,395 | A * | 10/1985 | Kolb | 134/115 R |
| 5,588,221 | A | 12/1996 | Hoeltke et al. | |
| 5,630,284 | A * | 5/1997 | Huang | 34/58 |
| 5,864,918 | A * | 2/1999 | Kosick | 15/248.2 |
| 6,038,787 | A * | 3/2000 | Dean et al. | 34/312 |
| 6,347,463 | B1 * | 2/2002 | Novak | 34/59 |
| 6,679,438 | B1 * | 1/2004 | Didlo | 239/288.5 |
| 7,181,802 | B2 * | 2/2007 | Kosick | 15/248.2 |
| 2003/0233763 | A1 * | 12/2003 | Dean | 34/58 |

FOREIGN PATENT DOCUMENTS

| | | | |
|---|---|---|---|
| DE | 3131937 | A1 * | 2/1983 |
| DE | 3424335 | A1 * | 1/1986 |

* cited by examiner

*Primary Examiner* — Kenneth Rinehart
*Assistant Examiner* — Corey J Hall
(74) *Attorney, Agent, or Firm* — King & Partners, PLC

(57) ABSTRACT

A paint brush cleaning apparatus having a rod with a first end portion spaced apart from a second end portion and a paint brush holder having a securement member for releasably securing a paint brush thereto. The rod having a longitudinal axis about which the rod and paint brush holder may rotate. An electric drill may be used in connection with the paint brush cleaning apparatus, with the first end portion typically sized and shaped to engage a drill bit receiving chamber of the electric drill. A protective sheet adapted to protect users from flying paint during the cleaning process may also be employed.

7 Claims, 5 Drawing Sheets

PAINT BRUSH CLEANING APPARATUS

BACKGROUND OF THE INVENTION

1. Field of the Invention

The present invention relates in general to a paint brush cleaning apparatus and, more particularly, to an apparatus adapted to apply radial acceleration to clean paint brushes.

2. Background Art

The cleaning of paint brushes saturated with paint has always presented considerable difficulties. Paint often sticks to the bristles of the brush and is difficult to remove. In addition, removing paint from saturated brushes often causes paint to splatter, thereby staining the clothes or skin of users and/or surrounding areas. Splattering is particularly problematic and potentially painful when paint contacts the eyes of the user. Various attempts have been made to combat this problem.

Common cleaning devices are manually operated and do not always protect users from flying paint. Thus, not only do users need to expend energy clearing paint from saturated brushes, they are also exposed directly to paint and the chemicals found in paint.

There is a need, therefore, for a paint brush cleaning apparatus that resolves one or more of the foregoing difficulties. These and other aspects of the present invention will become apparent in light of the present specification, claims, and drawings.

SUMMARY OF THE INVENTION

The present invention relates to an improved paint brush cleaning apparatus. As used herein the term paint brush shall mean any and all handheld devices for applying paint, including traditional paint brushes with bristles and rollers.

In one embodiment, the paint brush cleaning apparatus of the present invention comprises: (a) a rod comprising a first end portion and a second end portion; and (b) a paint brush holder comprising a securement member for releasably securing a paint brush to the paint brush holder. The first end portion is sized and shaped to engage a drill bit receiving chamber of an electric drill and spaced apart from the second end portion, wherein the rod comprises a longitudinal axis about which the rod is rotatable. The paint brush holder is secured to the second end portion of the rod and rotatable about the longitudinal axis.

In another embodiment, the paint brush cleaning apparatus comprises: (a) a rod comprising a first end portion and a second end portion; (b) a paint brush holder comprising a securement member for releasably securing a paint brush to the paint brush holder; and (c) a protective sheet positioned between the first end portion of the rod and the paint brush holder. The first end portion of the rod is spaced apart from the second end portion, and the rod comprises a longitudinal axis about which the rod is rotatable. The paint brush holder is secured to the second end portion of the rod and is also rotatable about the longitudinal axis. The protective sheet comprises a greater width dimension than the rod and is adapted to shield a user from paint spatter upon rotation of the rod and the paint brush holder.

In yet another embodiment, the paint brush cleaning apparatus comprises in combination: (a) a rod comprising a first end portion and a second end portion; (b) an electric drill releasably engageable to the first end portion of the rod; and (c) a paint brush holder comprising a securement member for releasably securing a paint brush to the paint brush holder. The rod comprises a longitudinal axis about which the rod is rotatable. The paint brush holder is secured to the second end portion of the rod and rotatable about the longitudinal axis.

The above-described embodiments may incorporate various other features. The first end portion may geometrically conform to the drill bit receiving chamber, comprising, for example, a hexagonal cross-section. The apparatus may further comprise a handle comprising a tubular shaft for receiving the rod, which may comprise a stop surface positioned to prevent translational movement of the handle beyond the first end portion. The apparatus may also comprise a protective sheet positioned between the paint brush holder and the first end portion. The protective sheet may be operable between a stored position and a deployed position, with a handle surrounding the rod capable of moving the protective sheet into the deployed position.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be further understood that the invention is not necessarily limited to the particular embodiments illustrated herein.

The invention will now be described with reference to the drawings wherein.

DETAILED DESCRIPTION OF THE INVENTION

Figure 1:
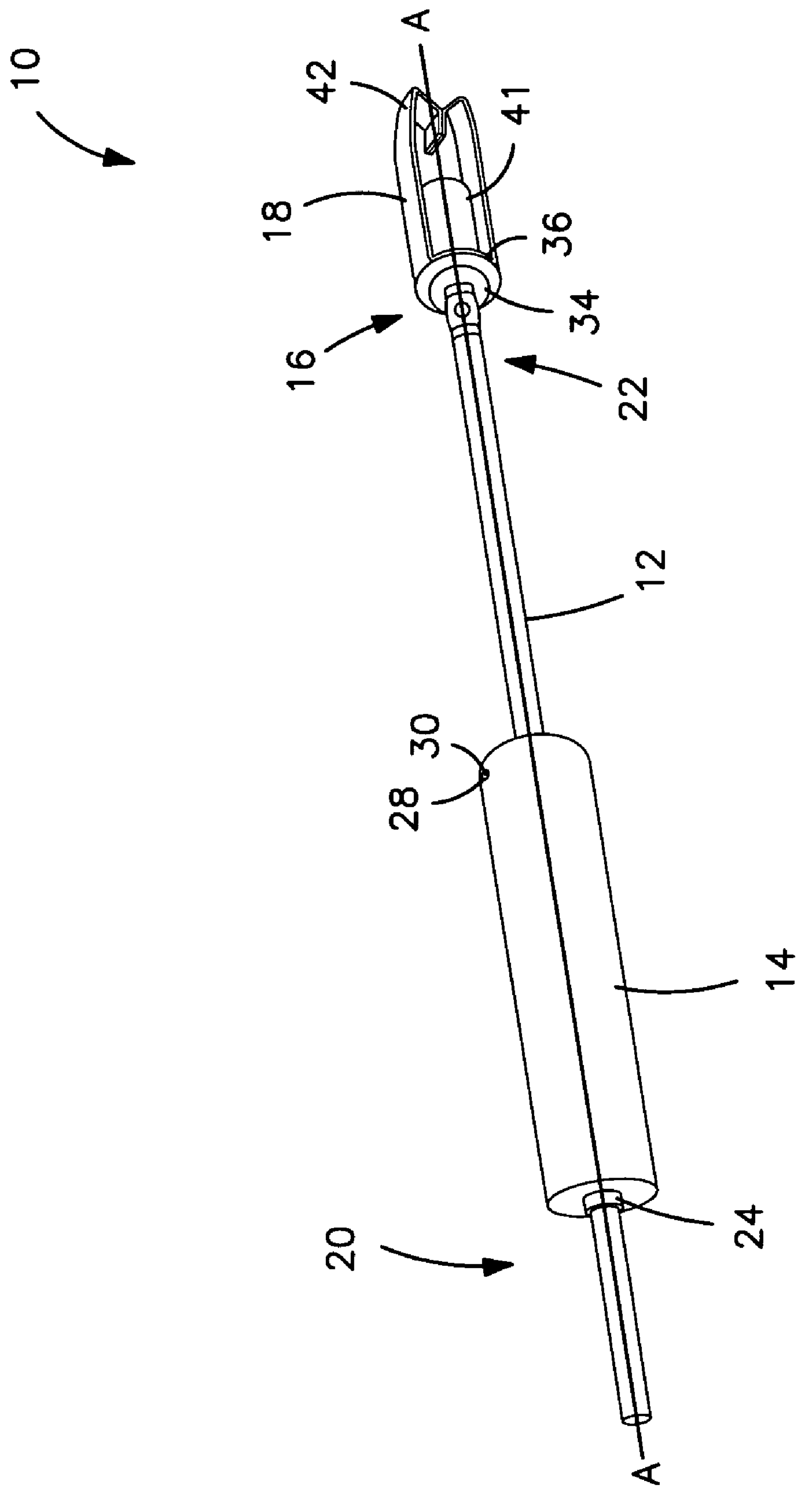
FIG. 1 is a perspective view of a paint brush cleaning apparatus fabricated in accordance with the present invention.

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Figure 2:
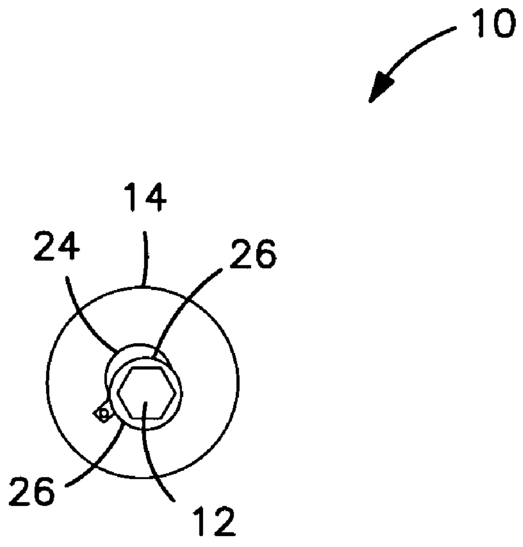
FIG. 2 is an end view of a paint brush cleaning apparatus fabricated in accordance with the present invention.

Referring now to FIGS. 1 and 2 collectively, paint brush cleaning apparatus 10 comprises rod 12, handle 14, connection assembly 16 and paint brush holder 18.

Rod 12 is rotatable about longitudinal axis A and extends from first end portion 20 to spaced apart second end portion 22. Rod 12 may further comprise stop surface 24. First end portion 20 may be sized and shaped to engage a drill bit receiving chamber of an electric drill and is releasably securable thereto. Electric drills are known in the art and are available from various sources, including Black Decker, Corp. of Towson, Md. Most often, first end portion 20 geometrically conforms to the shape of the drill bit receiving chamber and often comprises a hexagonal and/or octagonal cross-section as shown in FIG. 2. First end portion 20 may, of course, comprise other shapes, including square or round, depending on the size and shape of the drill bit receiving chamber in the electric drill employed. Stop surface 24 typically comprises a retaining ring positioned about rod 12, as best seen in FIG. 1. Stop surface 24 is adapted to prevent handle (i.e. grip) 14 from sliding off first end portion 20.

Figure 3:
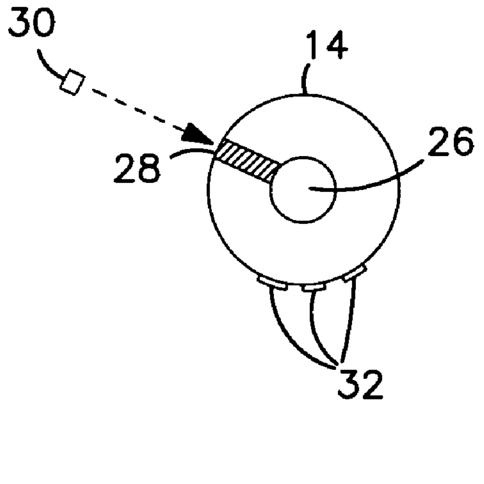
FIG. 3 is a cross-sectional view of a paint brush cleaning apparatus fabricated in accordance with the present invention.

As is best shown in FIG. 3, handle 14 may comprise tubular shaft 26 and aperture 28 positioned transverse to tubular shaft 26. Tubular shaft 26 is adapted to receive rod 12, while aperture 28 is adapted to receive optional set screw 30, discussed hereinbelow. Handle 14 may further comprise flutes 32 for enhanced gripping.

Connection assembly 16 is adapted to secure rod 12 to paint brush holder 18 and may comprise washer 34 and blind rivet 36. Rivet 36 comprises a flange and an opening for receiving second end portion 22 of rod 12, which is welded to rivet 36.

Paint brush holder 18 is adapted to releasably secure a paint brush to paint brush cleaning apparatus 10 and is secured to second end portion 22. Similar to rod 12, holder 18 is rotatable about longitudinal axis A. While holder 18 typically comprises first clamp 41 and second clamp 42 for receiving and retaining a paint brush, various other configurations may be employed. Holder 18 may, for example, comprise structures for providing a snap-fit arrangement or an interference fit.

Figure 5:
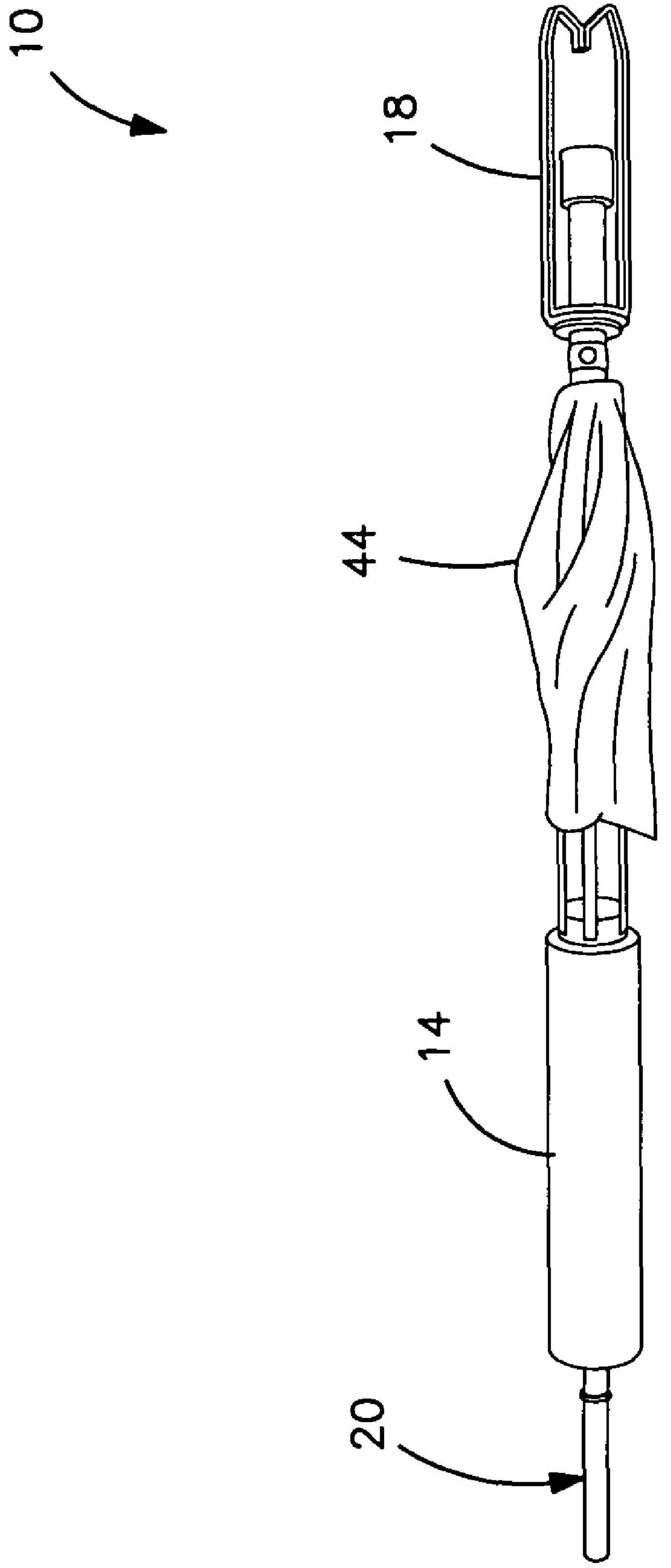
FIG. 5 is a perspective view of a paint brush cleaning apparatus fabricated in accordance with the present invention showing, among other things, a sheet member in a stored state.
Figure 6:
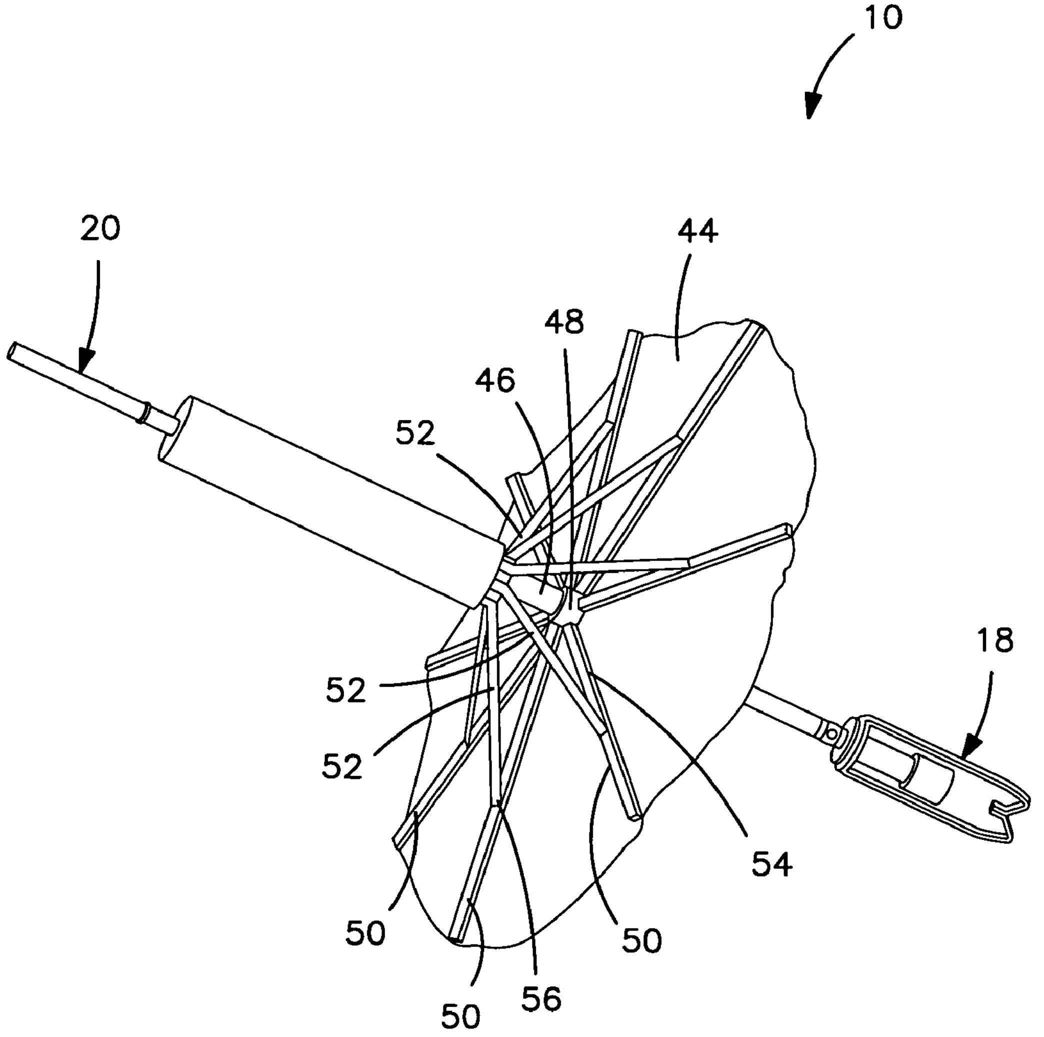
FIG. 6 is a perspective view of a paint brush cleaning apparatus fabricated in accordance with the present invention showing, among other things, a sheet member in a deployed state.

In an alternate embodiment, shown in FIGS. 5 and 6, paint brush cleaning apparatus 10 comprises protective sheet 44 positioned between first end portion 20 and paint brush holder 18. Protective sheet 44 protects users from paint spatter during the cleaning process. Protective sheet 44 may be designed to operate between a stored position (FIG. 5) and a deployed position (FIG. 6). In the deployed position, protective sheet comprises a width dimension substantially greater than a width dimension of rod 12. Protective sheet 44 comprises central aperture 46, ring member 48, frame 50, spokes 52 and runner 54. Central aperture 46 receives rod 12. Ring member 48 also receives rod 12 and is affixed to frame 50, which in turn is affixed to runner 54. Frame 50 and spokes 52 are secured to one another through hinge 56, such that protective sheet 44 can expand into the deployed position and collapse into the stored position. Runner 54 is positioned about rod 12 and is movable along longitudinal axis A of rod 12. Handle 14 and set screw 30 help hold runner 54 in position.

To make paint brush cleaning apparatus 10, the above-described components are provided. Protective sheet 44 and its associated components slide over first end portion 20 of rod 12 followed by handle 14. Set screw 30 is positioned in handle 14 and stop surface 24 is affixed to rod 12. Paint brush holder 18 is affixed to washer and rivot 36 is welded to second end portion 22 of rod 12.

Figure 4:
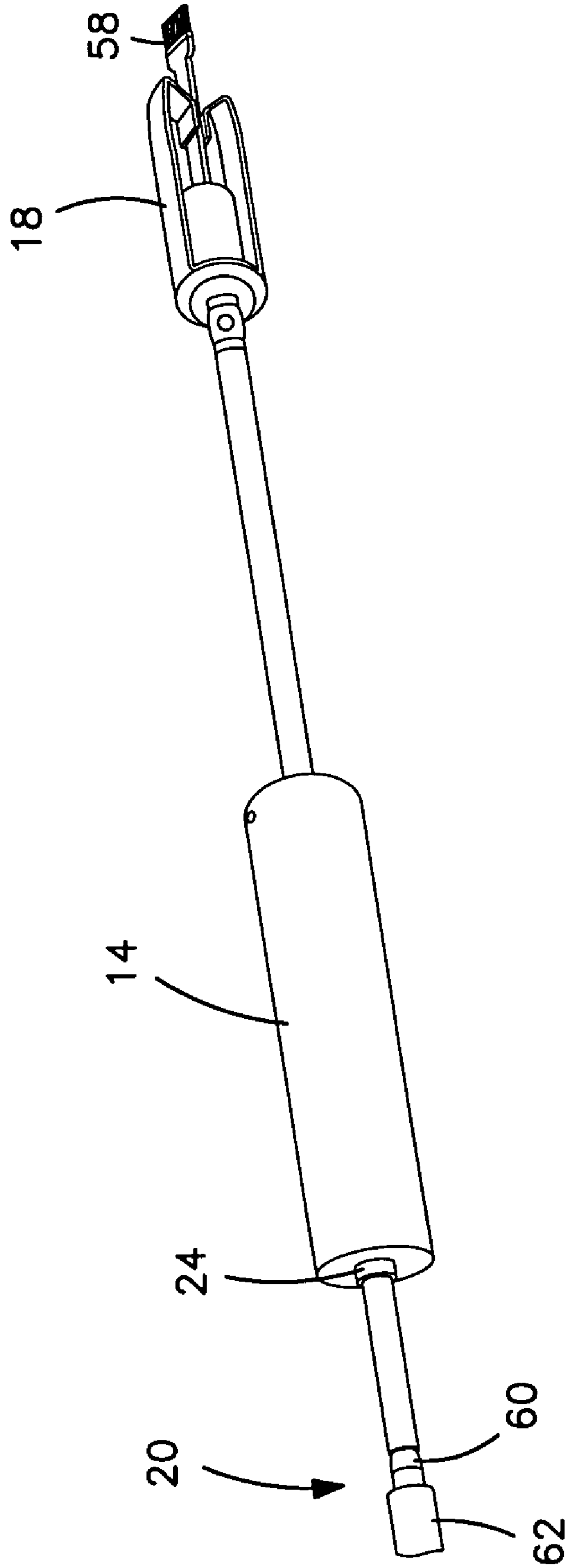
FIG. 4 is a perspective view of the paint cleaning apparatus of FIG. 1 in combination with a paint brush and an electric drill.

In operation, paint brush cleaning apparatus 10 is used to spin paint out of a paint brush by soaking or spinning in a suitable solvent or cleaning solution. Referring now to FIG. 4, paint brush 58 is secured to paint brush holder 18 and first end portion 20 engages drill bit receiving chamber 60 of electric drill 62. In embodiments employing protective sheet 44, handle 14 is moved toward second end portion 22, causing spokes 52 to move upwardly relative to frame 50 and placing protective sheet 44 in the deployed position. With paint brush 58 positioned in the suitable solvent or cleaning solution, electric drill 62 is activated, causing rod 12 and paint brush 58 to rotate about longitudinal axis A. This action clears paint from brush 58, while protective sheet 44 advantageously protects the user from paint spatter. Another advantage of the invention is that electric drill 62 enables a user to operate paint brush cleaning apparatus 10 with one hand. As used herein, the term electric drill shall mean any automated device capable of attachment to the first end portion 20 of rod 12 for causing rotation of rod 12 about longitudinal axis A.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A paint brush cleaning apparatus, comprising:

a rod comprising a first end portion and a second end portion, wherein the first end portion is sized and shaped to engage a drill bit receiving chamber of an electric drill and is spaced apart from the second end portion, and further wherein the rod comprises a longitudinal axis about which the rod is rotatable;

a paint brush holder comprising a securement member for releasably securing a paint' brush to the paint brush holder, wherein the paint brush holder is secured to the second end portion of the rod and is rotatable about the longitudinal axis;

a protective sheet positioned between the paint brush holder and the first end portion of the rod, wherein the protective sheet is operable between a stored position and a deployed position;

a handle surrounding the rod, wherein the handle moves the protective sheet into the deployed position upon displacement of the same along the longitudinal axis toward the second end portion of the rod; and a retaining ring positioned about the first end portion of the rod, wherein the retaining ring precludes the handle from sliding off of the rod.

2. The paint brush cleaning apparatus according to claim 1, wherein the first end portion geometrically conforms to the drill bit receiving chamber.

3. The paint brush cleaning apparatus according to claim 1, wherein the first end portion comprises a hexagonal cross-section.

4. The paint brush cleaning apparatus according to claim 1, wherein the apparatus is operable with one hand after the first end portion engages the drill bit receiving chamber.

5. The paint brush cleaning apparatus according to claim 1, wherein the securement member comprises at least one clamp.

6. A paint brush cleaning apparatus, consisting of:

a rod comprising a first end portion and a second end portion, wherein the first end portion is sized and shaped to engage a drill bit receiving chamber of an electric drill and is spaced apart from the second end portion, and further wherein the rod comprises a longitudinal axis about which the rod is rotatable;

a paint brush holder comprising a securement member for releasably securing a paint brush to the paint brush holder, wherein the paint brush holder is secured to the second end portion of the rod and is rotatable about the longitudinal axis;

a protective sheet positioned between the paint brush holder and the first end portion of the rod, wherein the protective sheet is operable between a stored position and a deployed position;

a handle surrounding the rod, wherein the handle moves the protective sheet into the deployed position upon displacement of the same along the longitudinal axis toward the second end portion of the rod; and a retaining ring positioned about the first end portion of the rod, wherein the retaining ring precludes the handle from sliding off of the rod.

7. A paint brush cleaning apparatus, consisting of:

a rod comprising a first end portion and a second end portion, wherein the first end portion is sized and shaped to engage a drill bit receiving chamber of an electric drill and is spaced apart from the second end portion, and further wherein the rod comprises a longitudinal axis about which the rod is rotatable;

a paint brush holder comprising a securement member for releasably securing a paint brush to the paint brush holder, wherein the paint brush holder is secured to the second end portion of the rod and is rotatable about the longitudinal axis;

a protective sheet positioned between the paint brush holder and the first end portion of the rod, wherein the protective sheet is operable between a stored position and a deployed position;

a fluted, cylindrical handle surrounding the rod, wherein the handle moves the protective sheet into the deployed position upon displacement of the same along the longitudinal axis toward the second end portion of the rod; and a cylindrical retaining ring positioned about the first end portion of the rod, wherein the retaining ring precludes the handle from sliding off of the rod.

* * * * *